Oct. 3, 1950   J. KELLOGG   2,524,449
REMOTE CONTROL
Filed Oct. 11, 1945   4 Sheets-Sheet 3
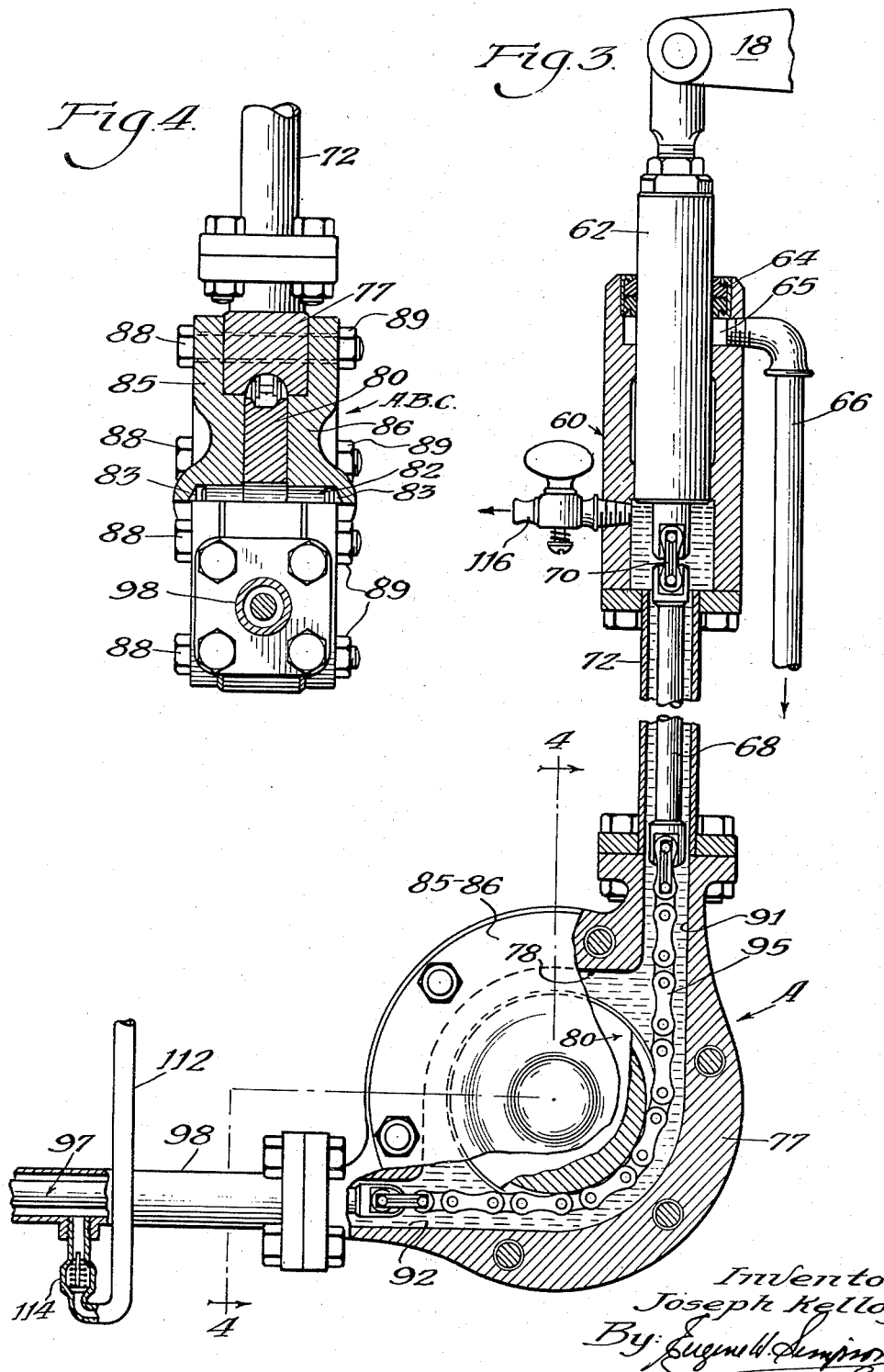

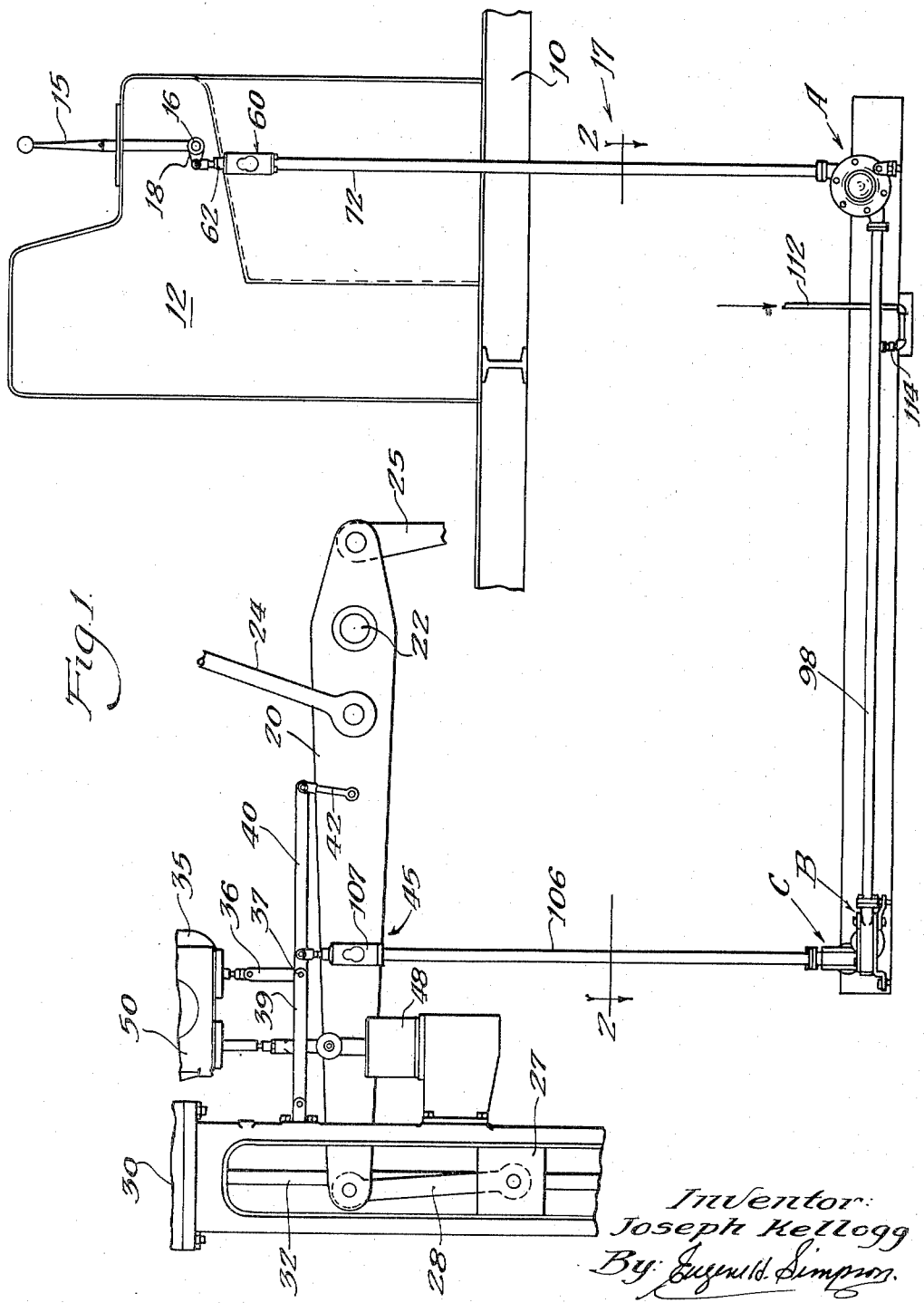

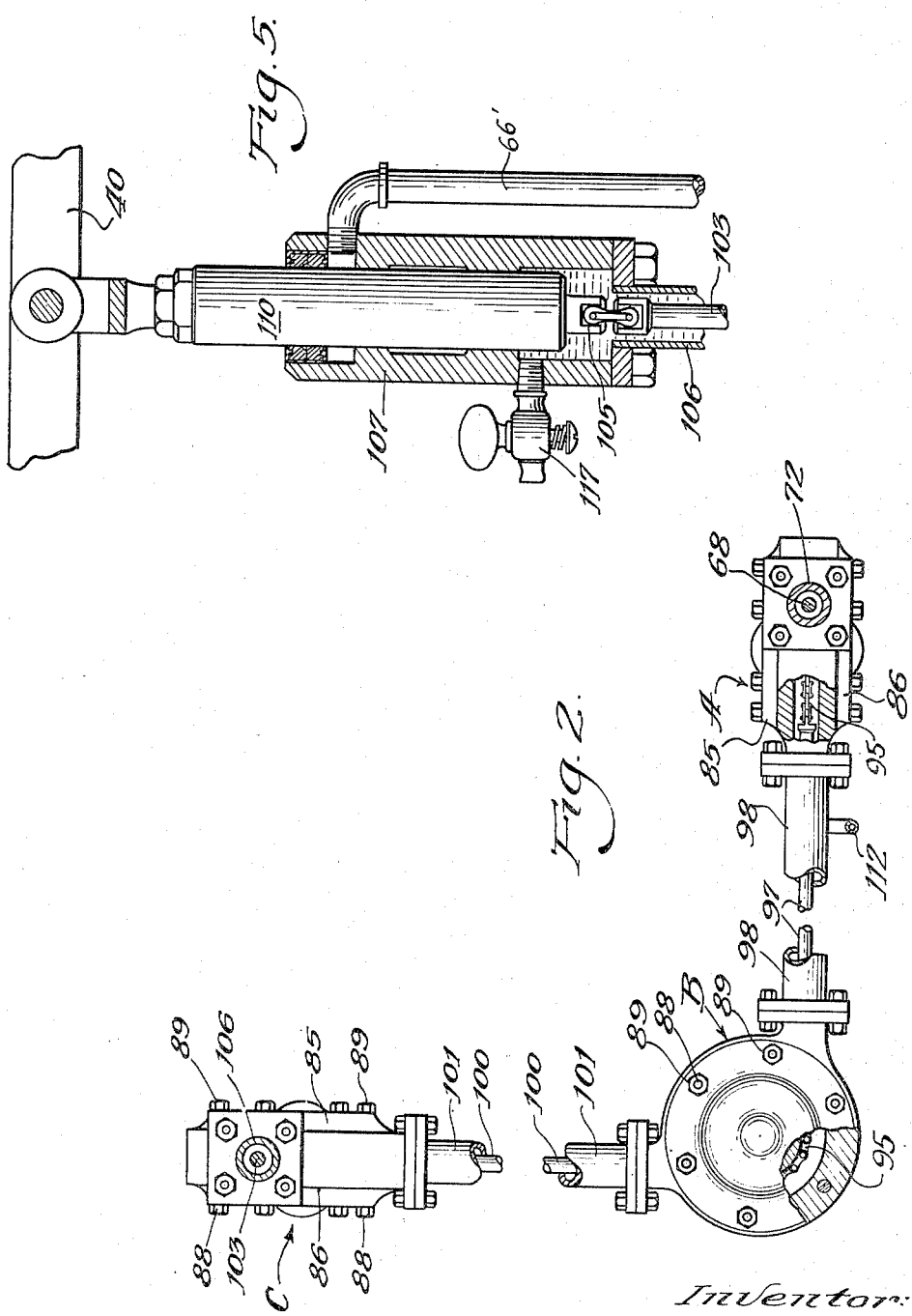

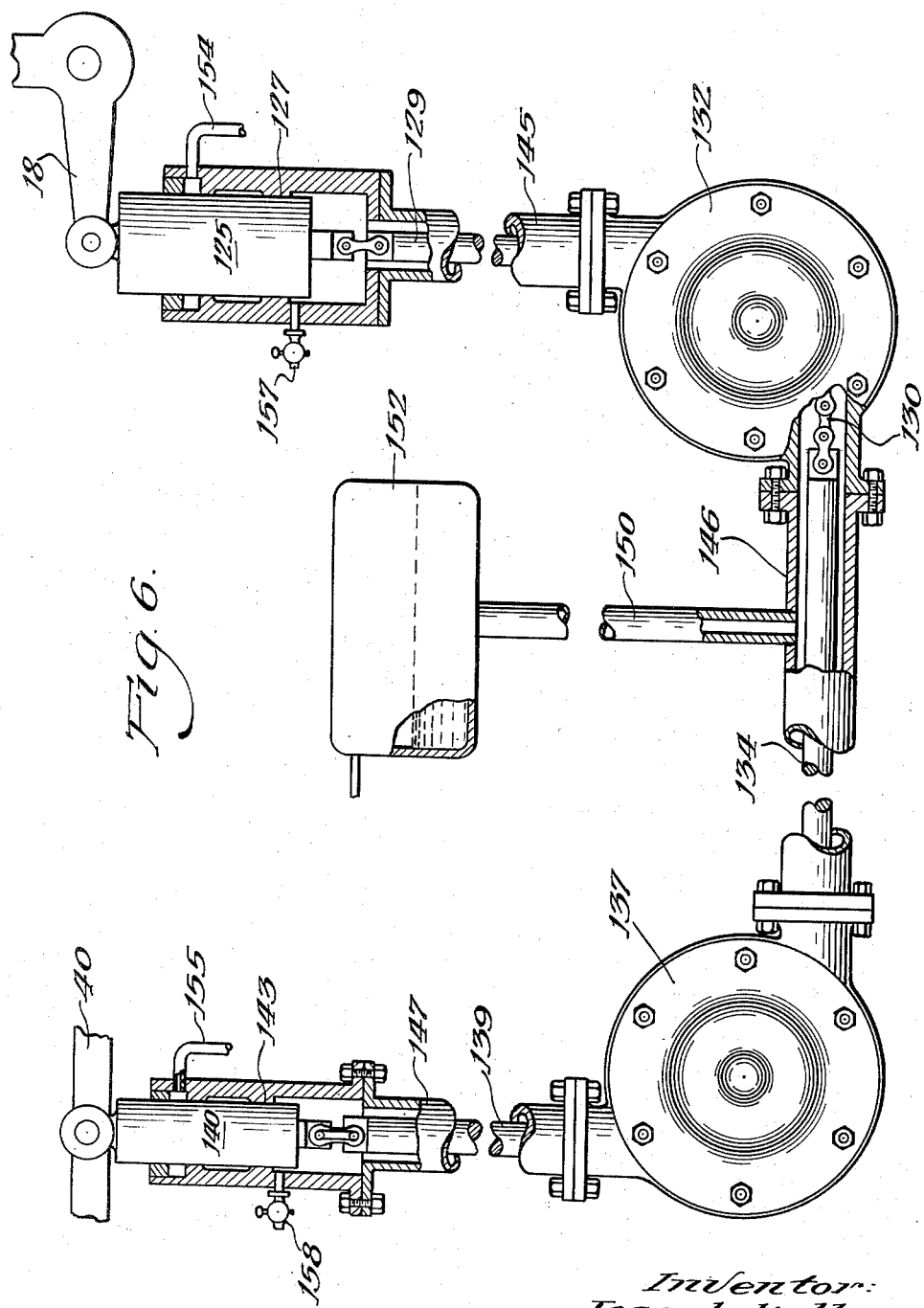

Patented Oct. 3, 1950

2,524,449

UNITED STATES PATENT OFFICE 2,524,449

REMOTE CONTROL

Joseph Kellogg, Milwaukee, Wis., assignor to Nordberg Manufacturing Company, Milwaukee, Wis., a corporation of Wisconsin Application October 11, 1945, Serial No. 621,763

2 Claims. (Cl. 60—54.5)

This invention relates to a remote control mechanism adapted to actuate a member from a point remote therefrom.

In remote control devices now being used, there is usually a small amount of play in the members, which results in inexact control of the operated member. Further trouble is experienced in extending the present controls around corners and particularly sharp corners. Where such changes in direction are necessary, the friction increases and considerably more power is required to operate the mechanism.

One object of the present invention is to provide a remote control in which the operated member will follow exactly the movement of the operating member.

Another object is to provide a remote control in which friction is reduced to a minimum.

A further object is to provide a remote control which will operate around relatively sharp corners.

A further object is to provide a remote control which will be simple to install and economical to manufacture.

A further object is to provide a remote control which may be operated with a minimum effort.

A still further object is to provide a remote control having no lost motion.

Other objects will become apparent from the following specification, which, when taken in conjunction with the accompanying drawings, illustrate two forms of the invention.

In its broad aspect the invention comprises a cylinder, a piston in the cylinder, an operating member, means connecting the operating member with the piston, an operated member, a cylinder adjacent the operated member, a piston in the last named cylinder, means connecting the last named piston with the operated member, hydraulic means connecting the cylinders to transmit compressive stresses between the pistons, and mechanical means connecting the pistons to transmit tensile stress between the pistons.

In the drawings:

Fig. 1 is a layout of the remote control embodying the invention as applied to a mine hoist;

Fig. 2 is a cross-section taken on the line 2—2 of Fig. 1;

Fig. 3 is a fragmentary elevational view, partly in cross-section, of the remote control shown in Fig. 1;

Fig. 4 is a cross-section taken on the line 4—4 of Fig. 3, looking in the direction of the arrows;

Fig. 5 is an elevational cross-sectional view through the center of the operated end of the remote control; and Fig. 6 is an elevational view similar to Fig. 1 but showing a slightly modified form of the invention.

Referring to the drawings, Figs. 1 to 5, inclusive, particularly to Fig. 1, the remote control is shown in connection with a mine hoist. The operator's platform 10 supports a control panel 12 containing the usual gages (not shown) and a brake lever 15. The brake lever 15 is pivoted at 16 to the control panel 12, and is connected to the operating side of the remote control, generally designated 17, forming the subject of this invention, by a bell crank lever 18.

The brake (not shown) is operated by a double action brake lever 20, which is pivoted at 22 to the brake post of the machine and has links 24 and 25 pivoted on opposite sides of the pivot 22 to actuate the brake posts (not shown).

The end of the lever 20 opposite the pivot 22 is connected to a setting weight (not shown) through a cross head 27 and a connecting link 28. The weight acts to set the brake and must be lifted to release the brake and free the drum.

The brake is released by a hydraulic cylinder and piston 30, which is connected to the cross head 27 by a connecting rod 32. Flow of oil into the lower end of the cylinder 30, below the piston raises the weight. The flow of oil into and out of the cylinder 30 is controlled by a main valve 35.

The valve 35 is connected by a link 36 through a pivotal connection 37 to a floating lever 40. A guide link 39 is pivotally connected to the frame of the machine, at one end, and to the link 36 and lever 40 at the other end, while the end of the lever 40 opposite the pivot 37 is pivotally connected to a link 42, which is, in turn, pivotally connected to the main lever 20.

The operated end 45 of the remote control mechanism 17 is connected to the lever 40 intermediate the ends of the lever, to return the valve to neutral when the brake has moved to the required position.

In the event power goes off while the machine is being operated a solenoid 48 operates an auxiliary valve 50 to apply the brakes and stop the hoist.

The remote control which joins the brake lever 15 with the brake lever 20 is best seen in Figs. 2 to 5, inclusive. Referring to those figures, a cylinder 60 is mounted in or adjacent the panel 12 and receives a piston 62 which is connected to the outer end of the bell crank lever 18.

The cylinder has a packing gland 64 at the upper end which prevents oil leaking past the piston from overflowing a recess 65. A drain pipe 66 returns oil which leaks past the piston 62 to its source.

The lower end of the piston 62 is connected to a pull rod 68 through a chain link 70. The pull rod 68 is mounted in a pipe or tubing 72 which has a fluid tight connection with the cylinder 63.

The opposite end of the tubing 72 is connected with a fluid tight connection to one sheave A of a plurality of similar sheaves A, B and C. Each of the sheaves A, B and C comprise a body portion 77 having a cylindrical aperture 78 therethrough which accommodates a grooved wheel 80.

The wheel 80 is mounted on an axle 82 which is held in apertures 83—83 in cover plates 85—86. The cover plates are held to the body portion 77 by means of bolts 88 which pass through both cover plates and the body portion and are secured by nuts 89. Gaskets or other suitable means may be employed to provide a fluid tight seal between the cover plates 85—86 and the body portion 77.

The body portion 77 has apertures 91 and 92 therein tangential to the sheave wheel 80 and extending into the aperture 78. While the apertures 91 and 92 are shown as being at right angles to each other it will be understood that they may be arranged at any convenient angle, depending on the angle through which it is desired to change the motion.

The end of the rod 68 opposite the link 70 is provided with a chain 95, which is so connected with the rod 68 as to flex readily about the wheel 80.

Sheaves A and B are connected by a pull rod 97, which is connected to the chains 95 in both sheaves A and B and transmits tension therebetween. The pull rod 97 is enclosed in a tubing 98 which has a fluid tight connection with both sheaves A and B.

The sheaves B and C are likewise joined by a pull rod 100, Fig. 2, which is connected to chains 95 in each sheave and enclosed in a tubing 101. The tubing 101 has fluid tight connections with both the sheaves B and C.

The sheave C is connected with the operated end 45 of the remote control by a pull rod 103, Figs. 2 and 5, which is connected to the chain 95 in the sheave C and to a chain link 105, Fig. 5, at the operated end of the remote control. The rod 103 is likewise enclosed in a tubing 106 which has a fluid tight connection with the sheave C and with an operated cylinder 107.

Referring to Fig. 5, the link 105 connects the rod 103 with an operated piston 110 in the cylinder 107. The piston 110 may be directly connected with the link 40 to actuate the brake in a manner to be described below. The links 70 and 105, the rods 68, 97, 100 and 103 and the chains 95 constitute a mechanical means connecting the pistons to transmit tensile stress therebetween.

The cylinders 60 and 107, the tubes 72, 98, 101 and 106 and the sheaves A, B and C constitute a fluid conduit adapted to transmit compressive stress through the fluid medium between the pistons. The conduit is filled with oil or other fluid through a supply pipe 112. The oil flows from a pressure source through the pipe 112 and past a check valve 114 into the pipe 98, the pressure source insuring that the entire system remain constantly full of fluid under pressure. When the fluid used is a liquid the high points in the remote control are provided with vents. Such vents are shown as pet cocks 116 and 117 opening into the cylinders 60 and 107, respectively. Air in the system may be vented by opening the pet cocks 116 and 117 allowing liquid to fill the system completely. Where gaseous fluid is used the pet cocks may be eliminated.

In the form of the device shown in Fig. 6 the control is adapted to return to normal when the brake handle is released.

As shown, the bell crank lever 18 is connected to an operating piston 125 which is mounted in a cylinder 127. The piston 125 is connected to a pull rod 129, which is connected to a chain 130, which passes around a sheave 132 similar to the sheaves A, B and C. A second rod 134 joins the chain 130 with a chain (not shown). The chain, not shown, operates around a sheave 137 similar to the sheaves A, B and C. A rod 139 connects the chain in the sheave 137 with an operated piston 140. The piston 140 operates in a cylinder 143 and may be connected to the floating lever 40.

The cylinders 127 and 143 and sheaves 132 and 137 are connected by pipes 145, 146 and 147 which enclose the rods 129, 134 and 139, respectively, and cooperate with the casings of the sheaves to form a fluid tight passage adapted to transmit compressive stresses between the pistons.

The pipe 146 has a pipe 150 connected thereto which leads to a pressure source 152. The pressure source 152 is maintained constantly under a greater pressure than developed by the levers 18 or 40 and supplies liquid to the remote control system under that pressure. The pipe 150 provides free ingress and egress for the liquid in the remote control.

The space above the cylinders 127 and 143 may be provided with drain pipes 154 and 155 which return oil leaking past the pistons to the oil pump.

The cylinders 127 and 143 may also be provided with pet cocks 157 and 158 to vent air in the system.

*Operation*

In operation the remote control system, shown in Figs. 1 to 5, inclusive, is filled with oil through the pipe 112 and check valve 114 at sufficient pressure to place the mechanical means 68, 70, 95, 97, 100, 103 and 105 which connect the pistons 62 and 110 under an initial tension which removes all slack from the system.

The air is eliminated from the system by opening the pet cocks 116 and 117 until oil flows out the cocks. The pet cocks 116 and 117 are then closed and the control is ready for operation.

The operator, wishing to apply the brakes, would pull back on the lever 15, or to the right as seen in Fig. 1, causing the bell crank lever 18 to raise the piston 62. This movement is transmitted from the piston 62 through the link 70, the rods 68, 97, 100 and 103, the chains 95 in the sheaves A, B and C and the link 105, to the piston 110 drawing the piston down an amount precisely equal to the movement of the piston 62.

Moving the piston downwardly moves the valve element in the valve 35 downwardly draining oil from the cylinder 30 causing the lever 20 to rotate counterclockwise about the pivot 22, applying more brake action. As the lever 20 rotates counterclockwise, the lever 40 raises the pivot point 37 to its original position before the lever 15 was moved, thus stopping further flow of oil from the cylinder 30 and stopping further movement of the brake shoes.

When it is desired to release the brake the lever 15 is moved forward, or to the left as shown in Fig. 1. Movement of the lever forward moves the piston 62 downwardly in the cylinder 60, forcing oil in the cylinder 60 out through the pipes 72, 98, 101, and 106 into the cylinder 107, raising the piston 110 in the cylinder 107 precisely the same amount that the piston 62 moved down.

It will be noted that, since there is oil pressure in the system, the chains and pull rods are under constant tension, and there is, therefore, no lost motion between the strokes of the piston.

When the piston 110 moves upwardly, it moves the valve 35 up causing oil to flow into the cylinder 30 raising the piston rod 32 and turning the lever 20 in a clockwise direction about the pivot 22. As the lever 20 rotates clockwise it relieves the brake and simultaneously the lever 40 lowers the pivot point 37 to its original position which closes the valve 35 and shuts off further flow of oil to the cylinder 30 thus stopping further brake release.

The sheaves A, B and C provide a substantially frictionless corner around which the chains 95 may transmit the stress in tension. The chains are arranged on the rods to flex around the sheaves. It will also be noted that since the pistons 62 and 110 are the same size they displace equal amounts of liquid and normally a constant amount of liquid is in the control member. Any liquid which leaks past the piston 62 is caught in a recess 65 in the cylinder and drains back through a pipe 66 to a liquid source. Similarly, a drain 66' is provided for liquid which leaks past the piston 110.

In the system shown in Fig. 6 the piston 125 is larger in area than the piston 140. Consequently, when pressure is exerted on the piston 125 the oil from the cylinder 127 flows out of the cylinder, part of this oil flowing through the system to raise the piston 140, and the excess oil flowing out through the pipe 150 and back into the oil pressure tank 152. When the bell crank lever 18 is released, oil from the pressure tank 152 exerts pressure under both pistons 125 and 140. Due to the difference in areas of the pistons 125 and 140, there is an unbalance in the system and the pressure acts to force the piston 125 into its uppermost position.

Due to the linkage joining the piston 125 and 140, the lineal movement of the one piston corresponds at all times to the lineal movement of the other.

The amount of friction in the system depends on the number of sheaves and upon the pressure in the system. The fewer sheaves and the lower the pressure, the greater will be the efficiency of the control.

If desired, either of the remote controls shown may be operated with air in place of the oil. In the event that air is used it is necessary to maintain the air pressure higher than any pressure that might be exerted in operating the system.

It is to be understood that the forms of the invention herein shown and described are to be taken merely as preferred examples of the same, and that various changes in size, shape and arrangement of parts may be resorted to without departing from the spirit of the invention or the scope of the subjoined claims.

That which is claimed as new and is desired to be secured by Letters Patent is:

1. A remote control adapted to actuate an operated member from an operating member spaced therefrom, said control comprising: an operating cylinder adjacent the operating member, an operating piston in said cylinder, means connecting the operating member with the operating piston, an operated cylinder adjacent the operated member, an operated piston in said operated cylinder, said operated piston having a different diameter than said operating piston, means connecting said operated piston with the operated member, a fluid conduit joining said cylinders to transmit fluid pressure between the pistons, said conduit including two parts at an angle to each other, a fluid under pressure in said conduit and between the pistons, a surge tank under pressure to supply fluid under pressure to said conduit, a sheave in said conduit at the angle, and tension resisting means in said conduit joining said pistons, said tension resisting means having a flexible portion extending around said sheave.

2. A remote control as defined in claim 1 in which the operating piston is of greater diameter than the operated piston.

JOSEPH KELLOGG.

REFERENCES CITED

The following references are of record in the file of this patent:

UNITED STATES PATENTS

| Number | Name | Date |
| --- | --- | --- |
| 770,298 | Maguire | Sept. 20, 1904 |
| 1,035,849 | Bergens | Aug. 20, 1912 |
| 1,983,962 | Barber | Dec. 11, 1934 |
| 2,109,114 | Kerr | Feb. 22, 1938 |